US009160231B2

(12) United States Patent
Labbe et al.

(10) Patent No.: US 9,160,231 B2
(45) Date of Patent: Oct. 13, 2015

(54) CIRCUIT WITH CURRENT-CONTROLLED FREQUENCY

(71) Applicant: ST-Ericsson SA, Plan-les-Ouates (CH)

(72) Inventors: Benoit Labbe, Grenoble (FR); David Chesneau, Saint Jean De Moirans (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/353,991

(22) PCT Filed: Sep. 25, 2012

(86) PCT No.: PCT/EP2012/068895
§ 371 (c)(1),
(2) Date: Apr. 24, 2014

(87) PCT Pub. No.: WO2013/072109
PCT Pub. Date: May 23, 2013

(65) Prior Publication Data
US 2014/0300335 A1    Oct. 9, 2014

Related U.S. Application Data

(60) Provisional application No. 61/568,704, filed on Dec. 9, 2011.

(30) Foreign Application Priority Data

Nov. 14, 2011    (EP) ................................ 11306478

(51) Int. Cl.
*G05F 3/16*        (2006.01)
*H02M 3/158*    (2006.01)
*H02M 3/156*    (2006.01)

(52) U.S. Cl.
CPC .............. *H02M 3/158* (2013.01); *H02M 3/156* (2013.01)

(58) Field of Classification Search
USPC ................. 323/222, 271, 282–285, 311–317; 327/539–543
See application file for complete search history.

(56) References Cited

U.S. PATENT DOCUMENTS

| 4,885,477 | A  | * | 12/1989 | Bird et al. ........................ 327/52 |
| 6,348,780 | B1 |   | 2/2002  | Grant |
| 6,369,561 | B1 | * | 4/2002  | Pappalardo et al. .......... 323/285 |
| 6,465,994 | B1 | * | 10/2002 | Xi ................................. 323/274 |
| 2004/0232901 | A1 |   | 11/2004 | Huang et al. |
| 2006/0043952 | A1 |   | 3/2006  | Huang |
| 2006/0091866 | A1 |   | 5/2006  | Tokumitsu et al. |
| 2008/0191673 | A1 | * | 8/2008  | Kimura ........................ 323/280 |
| 2011/0127985 | A1 |   | 6/2011  | Tsai et al. |

OTHER PUBLICATIONS

International Search Report issued in corresponding International application No. PCT/EP2012/068895, date of mailing Oct. 24, 2012.

(Continued)

*Primary Examiner* — Nguyen Tran
(74) *Attorney, Agent, or Firm* — Patent Portfolio Builders PLLC

(57) ABSTRACT

A circuit with current-controlled frequency implements a node (2) with an electrical charge which alternatively increases and decreases between two thresholds. The slew rate of the node can be adjusted using a tunable current source (1), thereby enabling tuning of a switching delay. The circuit may be used for controlling the switching frequency of a switch-mode power supply.

7 Claims, 3 Drawing Sheets

(56) References Cited

OTHER PUBLICATIONS

Pengfei, Li et al., "A 90-240Mhz Hysteretic Controlled DC-DC Buck Converter with Digitally PLL Frequency Locking," Custom Integrated Circuits Conference, 2008, CICC Jan. 1, 2008, IEEE, Piscataway, NJ, USA, pp. 21-24, CP009159666, ISBN978-4-4244,2018-6.

* cited by examiner

CIRCUIT WITH CURRENT-CONTROLLED FREQUENCY

BACKGROUND OF THE INVENTION

Implementing a phase-locked loop is common for controlling a frequency in an electronic circuit. Then, the frequency can be tuned by varying a parameter of the phase-locked loop which results in modifying a time-delay of one of the signals effective within the phase-locked loop.

Such electronic circuits may be frequency generators or switch-mode power supplies, for example.

Switch-mode power supplies such as DC-DC buck converters operate by pulse-width modulation for producing an output signal with desired voltage value. These switch-mode power supplies convert a continuous transfer function into a digital modulation scheme which results in a time-ratio suitable for producing the output voltage value desired.

A sliding-mode modulator converts the continuous transfer function by sign comparison. It provides asynchronous transient response, however the switching frequency itself is not primarily related with this voltage value, so that this frequency remains uncontrolled and may interfere with the operation of other systems. Because of this reason, it is often necessary to clamp or control the switching frequency of a switch-mode power supply, and a phase-locked loop is usually implemented to this purpose.

FIG. 1 is a block diagram of a known DC-DC buck converter used as an example. The reference number 10 generally indicates the converter, and the other reference numbers used in this Figure have the following meanings:

11 hysteresis comparator
12 switching logic and gate drivers unit of the converter, noted S.W.
13 power stage including a pMOS transistor 13a and a nMOS transistor 13b connected in series between terminals of a DC-power supply with supply voltage $V_{IN}$
14 a low-pass filter including a power inductance 14a and a capacitor 14b
15 an external load charge
16 a feedback line which may use a combination of the current $I_L$ in the power inductor 14a and the output voltage $V_{OUT}$ across the load charge 15 as feedback parameter In such sliding-mode operating circuit, the feedback line 16 is fed into the negative input terminal of the comparator 11, and a reference voltage $V_{REF}$ is applied to the positive input terminal of the comparator 11. Signal FB which is transmitted by the feedback line 16 becoming higher of less than a reference voltage $V_{REF}$ triggers the comparator 11 to switch, and the switch is propagated to the switching logic unit 12 and the power stage 13.

FIG. 2 is a block diagram of a known phase-locked loop design implemented for controlling the switching frequency of the converter 10 of FIG. 1. The converter 10 appears as a module in this loop, which also comprises a combiner 21 and a filter 22 noted L.P. The combiner 21 is fed with a frequency or phase reference $F_{REF}$ on one hand, and with a switching node $V_{LX}$ which is produced by the converter 10 and contains the switching frequency or phase. In a known manner, for example from document U.S. Pat. No. 6,348,780, the output of the low-pass filter 22 can be connected to a control terminal of the converter 10, suitable for modifying its switching frequency. Thus, tuning the frequency reference $F_{REF}$ allows adjusting the switching frequency of the controller 10. For example, the control terminal of the converter 10 acts by modifying features of the hysteresis cycle of the comparator 11 within the converter 10, such as the threshold values of the hysteresis cycle. But this first design of a tunable phase-locked loop leads to degraded transient behaviour for the converter 10, which is not acceptable for some applications.

Then, in particular for applications which require transient operation performances, it has been proposed to modify the phase-locked loop design by introducing a variable time-delay on the path of the switched signal, for example within the converter 10. Such design is described in particular by Pengfei Li et al. in "A 90-240 Mhz Hysteretic Controlled DC-DC Buck Converter with Digital PLL Frequency Locking", IEEE Custom Integrated Circuits Conference, pp. 21-24, San Jose, Calif., doi: 10.1109/CICC.2008.4672010. The principle is illustrated schematically in FIG. 3, where a chain of several tunable delay cells 25 is inserted in the path of the switched signal within the converter 10, for example within the switching logic unit 12 of FIG. 1. The total time-delay can be controlled digitally by a dedicated controller 26, noted CTRL. But such other design for a phase-locked loop requires more silicon chip area, and is energy consuming to a significantly higher extent.

Therefore, an object of the present invention is to propose a new design for adjusting a switching frequency, which alleviates the drawbacks of the prior designs.

SUMMARY OF THE INVENTION

To this end, embodiments of the invention propose a circuit with current-controlled frequency, which circuit comprises:

a variable current source, with adjustable current value;
a node, which is arranged for receiving a load current so as to vary in time an electrical charge related to this node;
a MOS transistor differential pair with two gate terminals of paired transistors which form first and second input terminals of the differential pair, with a common bias terminal of the differential pair which is connected to an output terminal of the current source, and the paired transistors being further connected at output so as to control positive and a negative values of the load current based on the current value of the current source, these positive and negative values for the load current being alternatively produced depending on a result of a comparison between signals existing at the first and second input terminals of the differential pair;
a reference source, which is connected for supplying a reference signal to the second input terminal of the differential pair;
at least one buffer module, which has an input terminal connected to the node, and an output terminal, and is arranged so that the output terminal of this buffer module switches from a first control state to a second control state when the electrical charge on the node has reached an upper threshold, and switches from the second control state back to the first control state when the electrical charge on the node has reached a lower threshold; and
a functional module with an input terminal which is connected to the output terminal of the buffer module, and a feedback terminal which is connected to the first input terminal of the differential pair, and this functional module being adapted for operating in switch-mode based on the first or second control state existing at its input terminal, and further adapted so that the feedback terminal transmits a feedback signal higher or less than the reference signal.

The node operates as a capacitor which is alternatively charged and discharged by the load current between both lower and upper thresholds, with a time-slope corresponding to the load current. Because of the operation of the MOS transistor differential pair, the load current is switched between positive and negative values which are set by the variable current source. This introduces a time-delay between the switching of the differential pair triggered by the feedback signal from the functional module, and the switching of the buffer module. So, varying the value of the current source causes the slew rate of the node to vary in turn, thereby modifying the switching frequency of the functional module. The differential pair, the node, the buffer module and the functional module thus form a phase-locked loop running at a frequency which is set by both the operation of the functional module and the adjustable current value of the current source.

Possibly, the current value of the current source may be user-adjustable.

Such tuning of the switching frequency does not degrade the transient operation of the functional module. In addition, it does not require much silicon chip area and increases the total energy consumption only to an insignificant or acceptable extent.

In particular, the functional module may be adapted so that the circuit form a switch-mode power supply or a frequency generator.

In some embodiments of the invention, the following improvements may be implemented either separately from each other or several of them in combination:
- the circuit may further comprise at least one branch which connects a terminal of the current source to a supply branch of the buffer module, and which is arranged for sensing the adjustable current value of the current source and for limiting an output current supplied by the buffer module based on the adjustable current value sensed;
- the circuit may still further comprise a first current-mirror assembly which is arranged for injecting a bias current into the common bias terminal of the differential pair, which corresponds to the current value of the current source;
- the circuit may still further comprise second and third current-mirror assemblies, which are each connected at input as a load charge for each paired transistor of the differential pair, and connected at output to the node so that the load current corresponds to a difference between currents passing through the paired transistors of the differential pair;
- the differential pair and a circuitry connecting outputs of this differential pair to the node may have a folded cascode configuration;
- the buffer module may have a class-A or push-pull type amplifier configuration, or a Schmidt trigger configuration; and
- the circuit may comprise several buffer modules which are connected in series to one another, with at least one connection between two successive ones of these buffer modules which form an additional node, with an additional time-varying electrical charge related to this additional node.

BRIEF DESCRIPTION OF THE DRAWINGS

Non-limiting embodiments of the invention are now described in detail, in connection with the following figures.

In these figures, same reference numbers used in separate figures indicate same elements, or elements with similar functions with respect to the invention embodiments.

Figure 1:
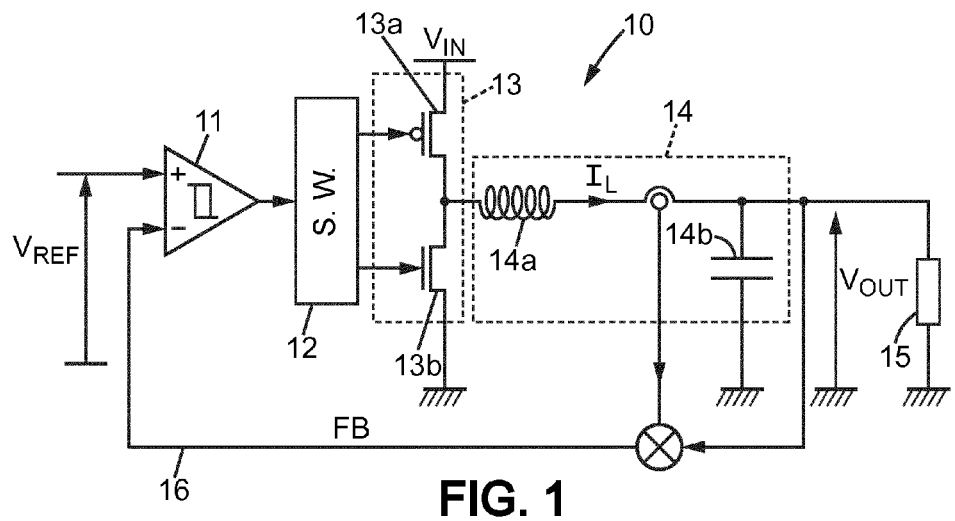
FIG. 1 is a block diagram of a known DC-DC buck converter, to which embodiments of the invention may be applied.
Figure 2:
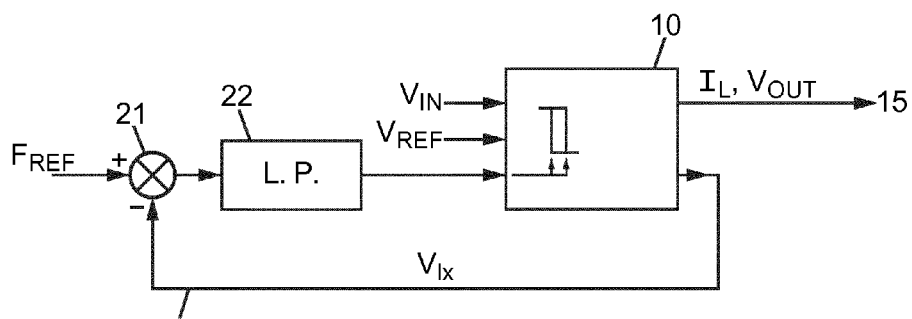
FIG. 2 is a block diagram of a known phase-locked loop implemented for controlling a switching frequency of a converter according to FIG. 1.
Figure 3:
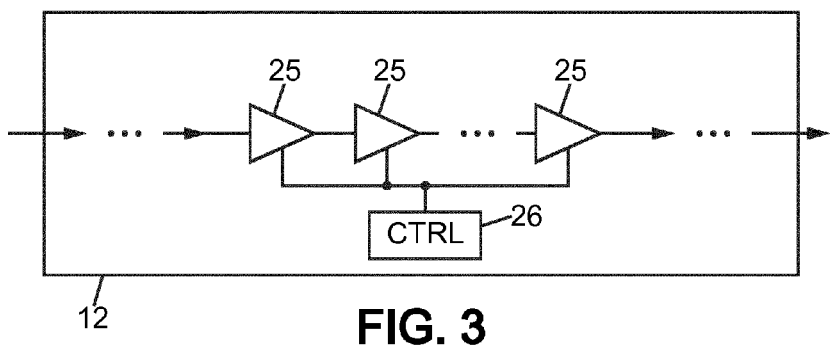
FIG. 3 is a block diagram of a known delay generator for controlling the converter switching frequency.

In addition, FIGS. 1 to 3 have already been described for illustrating the state of the art before the present invention.

DETAILED DESCRIPTION OF INVENTION EMBODIMENTS

Figure 4:
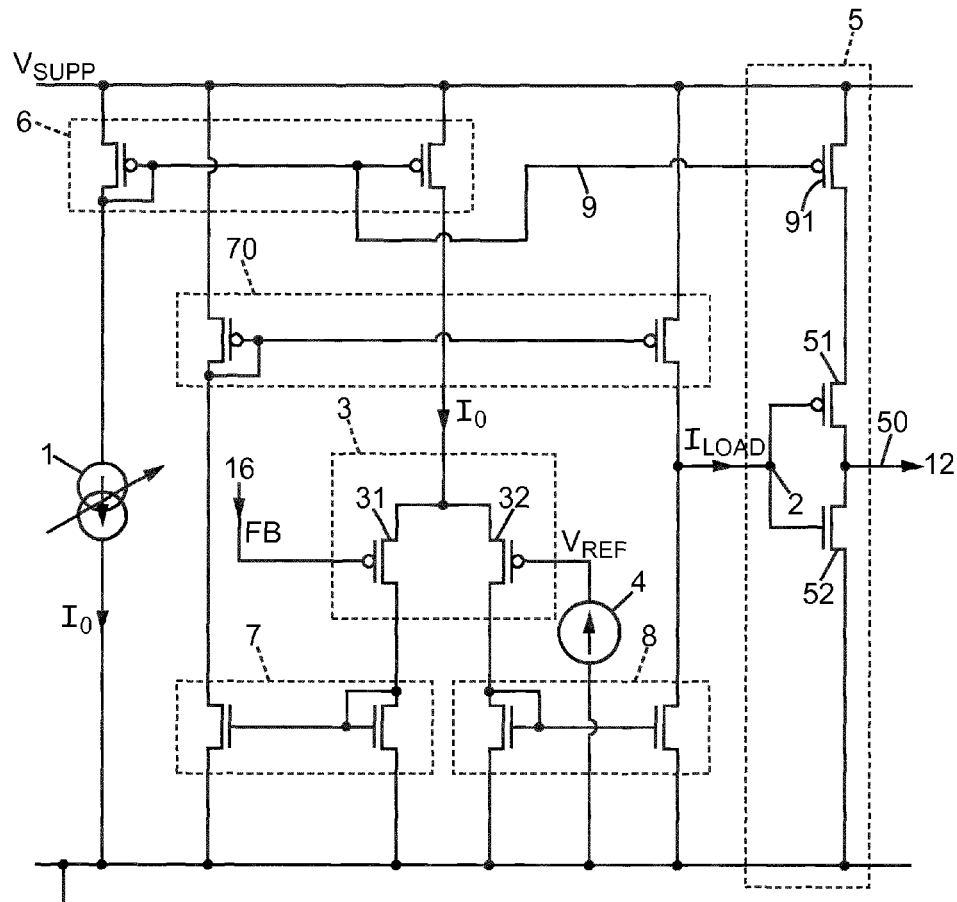
FIG. 4 represents a circuit according to a first embodiment of the invention.

Invention embodiments are now described in the context of tuning the switching frequency of a DC-DC buck converter, as shown in FIG. 1. The circuit displayed in FIG. 4 replaces the comparator 11 of FIG. 1. In FIG. 4, $V_{supp}$ designates a voltage of a power supply unit (not shown) used for energizing the electronic components represented, and possibly other components which are not directly connected with the operation of this invention embodiment. The following reference numbers have the following meanings:
- 1 variable current source, with adjustable current value denoted $I_0$
- 2 node with varying electrical charge
- 3 MOS transistor differential pair
- 4 voltage reference source
- 5 buffer module
- 6 first current mirror-assembly
- 7 and 8 second and third current-mirror assemblies
- 9 optional branch for limiting the current which is output by the buffer module 5

Reference number 50 additionally denotes the output terminal of the buffer module 5. It is connected to the input of the switching logic unit 12 of the converter 10. Thus, the functional module which is implemented in this invention embodiment corresponds to the switching logic unit 12, the power stage 13, and the low-pass filter 14. The feedback line 16 with feedback signal FB is then connected to a first one of the input terminals of the differential pair 3, so as to produce a dynamic regulation of the voltage $V_{OUT}$ produced by the converter 10.

The differential pair 3 may be formed by two paired transistors 31 and 32, for example of pMOS type. These are connected to each other in parallel with their respective drain terminals, thus forming a common bias terminal which is further connected to a bias source. In the exemplary embodiment described, such bias source is comprised of the current source 1 connected to the input side of the current-mirror assembly 6. Then, the output side of the current-mirror assembly 6 is connected to the drain terminals of the transistors 31 and 32, thereby forming the bias source with current value $I_0$. The respective gate terminals of the transistors 31 and 32 form the input terminals of the differential pair 3. For example, the feedback signal FB is fed into the gate terminal of the transistor 31. Then, the voltage reference source 4 is connected to the gate terminal of the transistor 32 for supplying thereto the reference voltage $V_{REF}$. Due to the operation of the differential pair 3, the current $I_0$ from the bias source is oriented through the transistor 31 when the feedback signal FB is less than $V_{REF}$, and through the transistor 32 when the feedback signal FB is higher than $V_{REF}$.

The current-mirror assembly 7 together with an additional current-mirror assembly 70 reproduces the current passing through the transistor 31 in a branch which feeds the node 2 with electrical charge from the terminal of the power supply unit with voltage $V_{SUPP}$. In parallel, the current-mirror assembly 8 reproduces the current passing through the transistor 32 in a branch which extracts electrical charge from the node 2. Thus, the electrical charge of the node 2 increases or decreases depending on the value of the feedback signal FB as compared with the reference value $V_{REF}$.

The load current is denoted $I_{LOAD}$, and appears to be a difference between the currents output respectively by the current-mirror assemblies 70 and 8. Thus, it also corresponds to the difference between the currents conducted respectively by the paired transistors 31 and 32.

The node 2 may be comprised of a capacitor in some implementations.

The buffer module 5 may be comprised of a push-pull assembly with MOS-power transistors 51 and 52. For example, transistor 51 is pMOS and transistor 52 is nMOS. When denoting $V_{TH1}$ and $V_{TH2}$ the respective threshold voltages of the transistors 51 and 52, the voltage at the output 50 of the buffer module 5 switches to zero-value when the charge on the node 2 has become high enough for the voltage of the node 2 to reach the value $V_{SUPP}$-$V_{TH1}$. Zero-voltage at output 50 corresponds to the first control state recited in the general part of this specification. This triggers the switching logic unit 12 to switch in turn, thereby causing the feedback signal FB to rise. When the feedback signal FB exceeds the value $V_{REF}$, the bias current $I_0$ turns to passing through the transistor 32 of the differential pair 3, causing the node 2 to discharge. The electrical charge of the node 2 goes on decreasing until the voltage of the node 2 reaches the value $V_{TH2}$. This value causes the output 50 of the buffer module 5 to switch to $V_{SUPP}$, corresponding to the second control state, and the switching logic unit 12 switches back, causing the feedback signal FB start decreasing.

Such operation is that of a phase-locked loop, with a frequency depending on the charging duration and the discharging duration of the node 2 between the limit values $V_{TH2}$ and $V_{SUPP}$-$V_{TH1}$ for the corresponding voltage. Because the electrical charge of the node 2 is varied in relation to the current $I_0$ of the tunable current source 1, the invention circuit enables adjusting the switching frequency of the functional module by tuning the current source 1.

According to an improvement of the invention embodiment described, the circuit may further comprise optionally an additional branch 9 for limiting the current through the transistor 51 of the buffer module 5. This branch may connect the gate of an input side transistor of the current-mirror assembly 6 to a gate of an additional transistor 91 arranged between the terminal of the power supply unit with voltage $V_{SUPP}$ and the drain terminal of the transistor 51. The transistor 91 is dimensioned appropriately for causing a voltage drop sufficient for limiting the current conducted by the transistor 51. In the same manner, another additional branch (not shown) may be provided for limiting the current conducted by the transistor 52, with another limiting transistor arranged between the source terminal of the transistor 52 and the ground terminal of the power supply unit.

Obviously, many changes may be introduced with respect to the invention embodiment of FIG. 4. In particular, other circuit designs may be implemented between the MOS transistor differential pair 3 and the node 2, while maintaining alternative charge and discharge of the node 2 with a load current which depends of the tunable value of the current source 1.

Designs for the buffer module 5 other than the push-pull assembly with or without current-limiting transistors are also possible. In particular designs of Class-A amplifiers or a Schmidt trigger configuration may be used.

Figure 5:
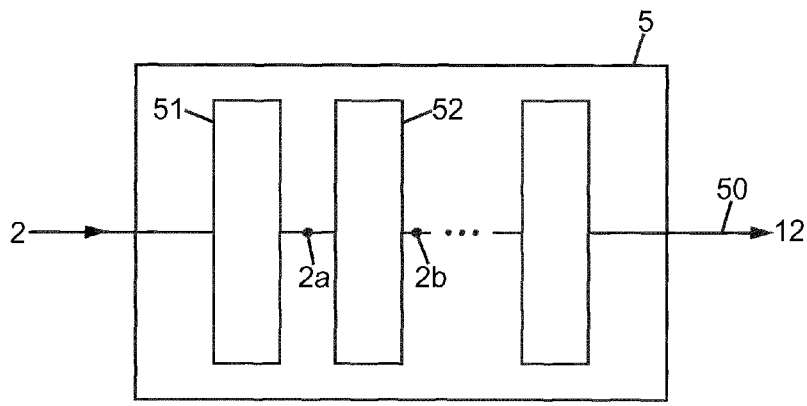
FIG. 5 illustrates a possible improvement of the invention embodiments.

The buffer module 5 may also have a complex design, with several base buffer modules connected in a serial chain between the node 2 and the output 50 of the whole buffer module thus constructed. FIG. 5 illustrates such design with the base buffer modules denoted 51, 52 . . . and the intermediate connections 2a, 2b . . . between two successive of the base buffer modules. Then, each connection 2a, 2b . . . may form an additional node with a function similar to that of the node 2. Namely, each connection 2a, 2b . . . may support a varying electrical charge which is supplied of extracted by the output current of the base buffer module just before in the chain. Then, the total time-delay effective in the phase-locked loop is the sum of all the respective cycling durations of the node 2 and the additional nodes within the buffer module 5. Furthermore, the current output by each one of the base buffer modules 51, 52 . . . may be tunable either in correlation with the current source 1 or independently.

Also possible is that the buffer module 5 is part of the functional module of the converter 10, but the function of setting the lower and upper thresholds for the electrical charge of the node 2 should be maintained, whatever the actual function of the functional module may be.

Figure 6:
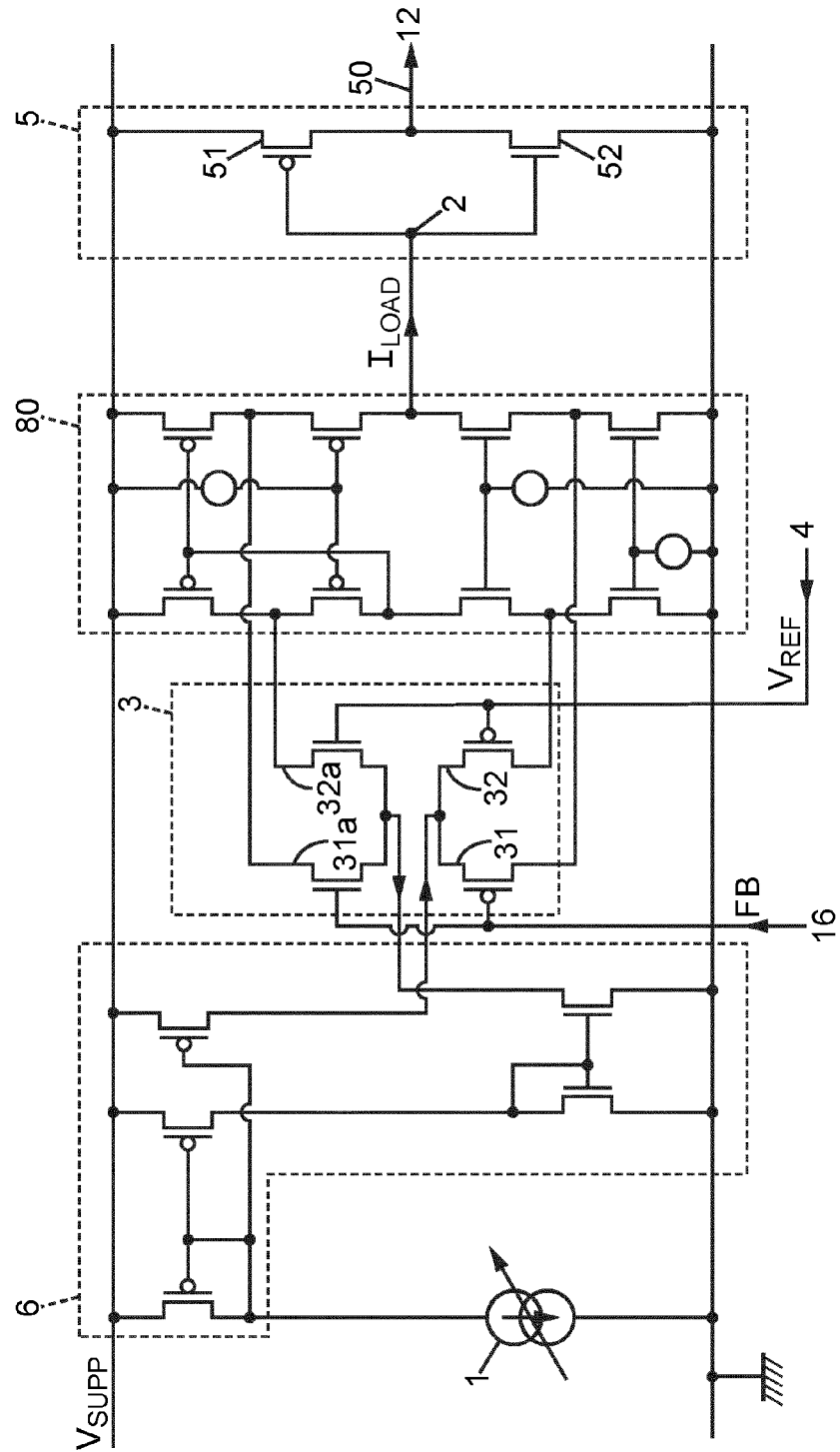
FIG. 6 represents another circuit according to a second embodiment of the invention.

FIG. 6 illustrates another possible embodiment of the invention, with folded cascode configuration for the MOS transistor differential pair 3 and its connection to the node 2. Actually, the circuit of FIG. 6 may be used instead of that of FIG. 4, with same connections to the converter 10 of FIG. 1. According to the folded cascode configuration, the paired transistors 31 and 32, of pMOS type, are duplicated with additional paired transistors 31a and 32a of nMOS type. Each couple of paired transistors operates as described in relation with FIG. 4, and is fed with respective bias currents corresponding to the $I_0$-value of the variable current source 1. The modified current-mirror assembly 6 injects current $I_0$ into the common bias terminal of the paired transistors 31 and 32, and also extracts current $I_0$ out of the common bias terminal of the paired transistors 31a and 32a. The circuitry 80 intermediate between the differential pair 3 thus produced and the buffer module 5 is comprised mainly of two parallel branches each connecting both terminals of the power supply unit. Each one of these branches is comprised of four serial-connected MOS transistors, and operates as a current-mirror assembly. The right-hand branch thus corresponds functionally to the series of the current-mirror assemblies 7 and 70 of FIG. 4, and the left-hand branch corresponds to the current-mirror assembly 8. The circles within the circuitry 80 indicate voltage sources used for setting the operating point of this current-mirroring module. Such folded cascode configuration is well-known in the art, so that it is not necessary to further explain its operation principle. One of its advantages consists in a dynamic operation range which is larger than the simple configuration of FIG. 4.

The invention claimed is:
1. Circuit with current-controlled frequency, comprising:
a variable current source, with adjustable current value;
a node arranged for receiving a load current so as to vary in time an electrical charge related to said node;
a MOS transistor differential pair with two gate terminals of paired transistors forming first and second input terminals of the differential pair, with a common bias terminal of said differential pair connected to an output terminal of the current source, and said paired transistors being further connected at output so as to control posi- tive and negative values of the load current based on the current value of the current source, said positive and negative values for the load current being alternatively produced depending on a result of a comparison between signals existing at the first and second input terminals of the differential pair;

a reference source connected for supplying a reference signal to the second input terminal of the differential pair;

at least one buffer module having an input terminal connected to the node, and an output terminal, and arranged so that the output terminal of said buffer module switches from a first control state to a second control state when the electrical charge on the node has reached an upper threshold, and switches from said second control state back to said first control state when said electrical charge on the node has reached a lower threshold;

a functional module with an input terminal connected to the output terminal of the buffer module, and a feedback terminal connected to the first input terminal of the differential pair, said functional module being adapted for operating in switch-mode based on the first or second control state existing at the input terminal of said functional module, and further adapted so that the feedback terminal transmits a feedback signal higher or less than the reference signal; and at least one branch connecting a terminal of the current source to a supply branch of the buffer module, and arranged for sensing the adjustable current value of said current source and for limiting an output current supplied by the buffer module based on the adjustable current value sensed.

2. Circuit according to claim 1, wherein the functional module is adapted so that said circuit form of a switch-mode power supply or a frequency generator.

3. Circuit according to claim 1, further comprising a first current-mirror assembly arranged for injecting a bias current corresponding to the current value of the current source, into the common bias terminal of the differential pair.

4. Circuit according to claim 1, further comprising second and third current-mirror assemblies each connected at input as a load charge for each paired transistor of the differential pair, and connected at output to the node so that the load current corresponds to a difference between currents passing through said paired transistors.

5. Circuit according to claim 1, wherein the differential pair and a circuitry connecting outputs of said differential pair to the node have a folded cascode configuration.

6. Circuit according to claim 1, wherein the buffer module has a class-A or push-pull type amplifier configuration, or has a Schmidt trigger configuration.

7. Circuit according to claim 1, comprising several buffer modules connected in series to one another, with at least one connection between two successive ones of said buffer modules forming an additional node, with an additional time-varying electrical charge related to said additional node.

* * * * *